United States Patent
Pietsch et al.

(10) Patent No.: US 11,513,756 B2
(45) Date of Patent: Nov. 29, 2022

(54) COORDINATING ADJUSTMENTS TO COMPOSITE GRAPHICAL USER INTERFACES GENERATED BY MULTIPLE DEVICES

(71) Applicant: Apple Inc., Cupertino, CA (US)

(72) Inventors: Brian D. Pietsch, Foster City, CA (US); Jianhong Jiang, Santa Clara, CA (US); Kevin W. Mar, Sunnyvale, CA (US); Thomas R. Powell, San Francisco, CA (US); Glenn A. Anderson, Campbell, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 17/031,488

(22) Filed: Sep. 24, 2020

(65) Prior Publication Data

US 2021/0096805 A1    Apr. 1, 2021

Related U.S. Application Data

(60) Provisional application No. 62/907,201, filed on Sep. 27, 2019.

(51) Int. Cl.
| | | |
|---|---|---|
| *G06F 3/0481* | (2022.01) | |
| *G06F 3/14* | (2006.01) | |
| *G06F 3/0484* | (2022.01) | |

(52) U.S. Cl.
CPC .......... *G06F 3/1454* (2013.01); *G06F 3/0481* (2013.01); *G06F 3/0484* (2013.01)

(58) Field of Classification Search
CPC .... G06F 3/1454; G06F 3/0481; G06F 3/0484; G06F 3/147; G06F 3/048; G09G 2340/14; G09G 2354/00; G09G 2370/022; G09G 2370/16
See application file for complete search history.

(56) References Cited

U.S. PATENT DOCUMENTS

| | | | |
|---|---|---|---|
| 9,843,618 B2 * | 12/2017 | Lee | G06F 3/1423 |
| 2006/0037051 A1 * | 2/2006 | McDowell | H04N 21/4143 |
| | | | 725/38 |
| 2006/0037053 A1 * | 2/2006 | McDowell | H04N 21/43615 |
| | | | 725/100 |
| 2006/0037054 A1 * | 2/2006 | McDowell | H04N 21/43615 |
| | | | 725/136 |

(Continued)

*Primary Examiner* — Jeanette J Parker
(74) *Attorney, Agent, or Firm* — Invoke

(57) ABSTRACT

In some implementations, a user device can coordinate adjustments to a composite GUI generated in cooperation with an accessory device that presents the composite graphical user interface. For example, the user device can receive configuration data that defines the maximum GUI display area (e.g., size, dimensions) of the accessory device, various view areas within the GUI display area of the accessory device into which the user device can render GUIs, and/or transitions between the various view areas. The user device can generate a display buffer based on the maximum GUI display area, generate a graphical user interface in an area of the buffer corresponding to a current view area specified by the accessory device, and send to the accessory device video frames corresponding to the display buffer. The accessory device can generate a composite GUI based on the received video frames that include the user device generated GUI.

21 Claims, 9 Drawing Sheets

(56) References Cited

U.S. PATENT DOCUMENTS

| | | | |
|---|---|---|---|
| 2013/0194270 A1* | 8/2013 | Walls | H04L 67/025 345/428 |
| 2014/0229852 A1* | 8/2014 | Lee | G06F 3/14 715/748 |
| 2015/0065056 A1* | 3/2015 | Won | H04M 1/72412 455/41.3 |
| 2015/0145750 A1* | 5/2015 | Shin | G09G 5/391 345/2.2 |
| 2017/0052757 A1* | 2/2017 | Kanda | H04N 7/147 |

* cited by examiner

COORDINATING ADJUSTMENTS TO COMPOSITE GRAPHICAL USER INTERFACES GENERATED BY MULTIPLE DEVICES

RELATED APPLICATIONS

This application claims the benefit of the filing date of U.S. Provisional Patent Application No. 62/907,201 filed on Sep. 27, 2019, which is hereby incorporated by reference.

TECHNICAL FIELD

The disclosure generally relates to generating graphical user interfaces.

BACKGROUND

Some user devices (e.g., mobile devices, smartphones, tablet computers, etc.) are configured to interact with accessory devices (e.g., in-car infotainment systems) to provide mobile device functionality through the displays and/or speakers of the accessory devices. For example, a user device may generate and provide to the accessory device various user interfaces for accessing music features, navigation features, messaging features, etc., of the user device through the user interfaces of an accessory device. In some instances, the accessory device may be configured to present a graphical user interface of the accessory device simultaneously with the graphical user interface received from the user device.

SUMMARY

In some implementations, a user device can coordinate adjustments to a composite GUI generated in cooperation with an accessory device that presents the composite graphical user interface. For example, the user device can receive configuration data that defines the maximum GUI display area (e.g., size, dimensions) of the accessory device, various view areas within the GUI display area of the accessory device into which the user device can render GUIs, and/or transitions between the various view areas. The user device can generate a display buffer based on the maximum GUI display area, generate a graphical user interface in an area of the buffer corresponding to a current view area specified by the accessory device, and send to the accessory device video frames corresponding to the display buffer. The accessory device can generate a composite GUI based on the received video frames that include the user device generated GUI.

Particular implementations provide at least the following advantages. Implementations described herein avoid having to tear down, reconfigure, and reestablish a video stream encoder or decoder when resizing a view area allocated to a user device for generating user device graphical user interfaces on an accessory device. By using a maximally sized encoder/decoder/display buffer the view area allocated to the user device can be resized without impacting the user's use and enjoyment of the user device/accessory device system. Moreover, manufacturers and end users of accessory devices are provided more flexibility in how their graphical user interfaces are composited with and/or presented with user device graphical user interfaces.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
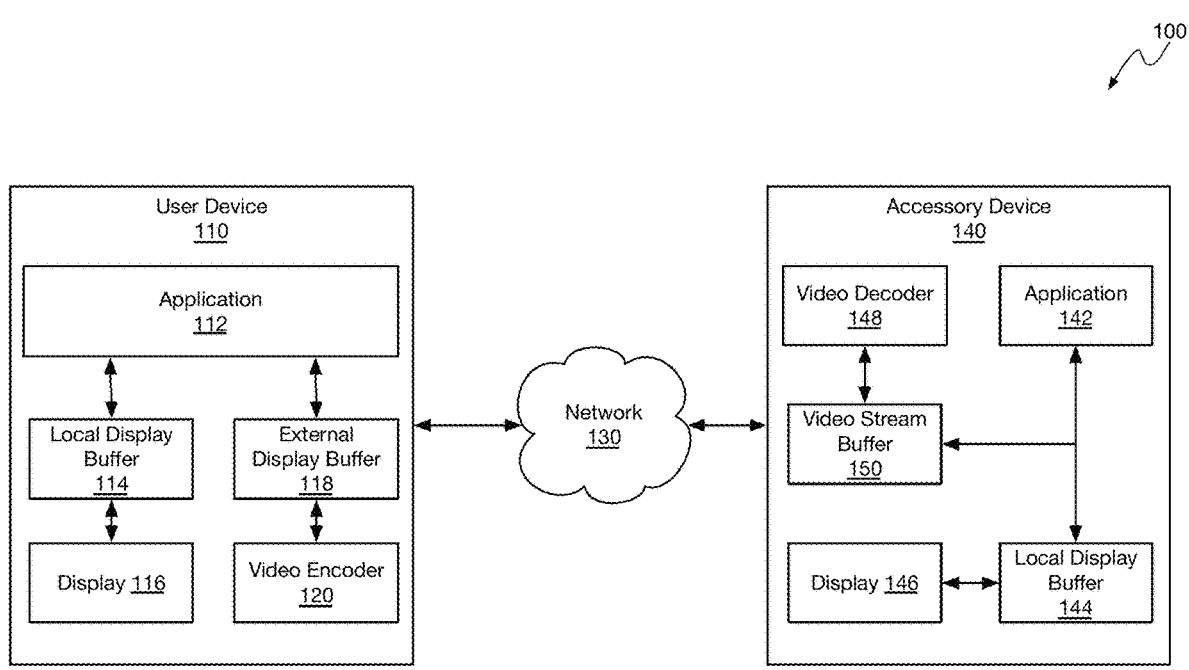
FIG. 1 is a block diagram of an example system for coordinating adjustments to composite graphical user interfaces (GUIs) generated by multiple devices.

FIG. 1 is a block diagram of an example system 100 for coordinating adjustments to composite graphical user interfaces (GUIs) generated by multiple devices. For example, system 100 can be configured to stream a graphical user interface generated by a user device to an accessory device for compositing with a graphical user interface generated by the accessory device to generate a composite graphical user interface that may include both the user device GUI and the accessory device GUI. The accessory device can specify a maximum GUI display area allocated to the user device for presenting the user device GUI. The user device and accessory device can configure video stream encoders and decoders for the maximum GUI display area allocated by the accessory device to the user device for presentation of the user device GUI. The user device can render a graphical user interface into the entire display area or a portion (e.g., less than the entire display area) depending on the context (e.g., functions being performed, applications in use, user input received, etc.) of system 100. When transitioning the user interface generated by the user device between different portions of the display area, the user device and the accessory device can coordinate the transitions to so that the composite GUI can be generated and presented (e.g., animated) in a coordinated, coherent manner.

In some implementations, system 100 can include user device 110. For example, user device 110 can be a mobile device, such as a smartphone, tablet computer, smartwatch, or other type of computing device.

User device 110 can include application 112. For example, application 112 can be any type of software application supported by the operating system and/or hardware of user device 110. Application 112 can correspond to a user installed software application, such as a music application, messaging application, navigation application, etc. Application 112 can correspond to an original equipment manufacturer (OEM) application, such as a preinstalled music application, messaging application, navigation application, etc., installed by the manufacturer of user device 110 or installed by the manufacturer of the operating system of user device 110. Application 112 can correspond to the operating system of user device 110, or a portion thereof. For example, application 112 can correspond functions, accessories, daemons, utilities, etc., of the operating system that present desktop user interfaces, home screen user interfaces, and/or other graphical user interfaces of user device 110.

In some implementations, user device 110 can include local display buffer 114. For example, when application 112 generates a graphical user interface for display locally on user device 110, application 112 can render the graphical user interface into local display buffer 114. Display 116 (or a display driver) can read the graphical user interface from local display buffer 114 and present the graphical user interface on display 116.

In some implementations, user device 110 can include external display buffer 118. For example, when application 112 generates a graphical user interface for display on an accessory device (e.g., a remote device, a separate computing device, etc.), application 112 can render the graphical user interface into external display buffer 118. Video encoder 120 can read the graphical user interface from external display buffer 118 and encode the graphical user interface into video frames that are, or can be, streamed by user device 110 to the destination accessory device. The destination accessory device can then present the video frames (e.g., the graphical user interface generated by user device 110) on a display of the accessory device.

In some implementations, video encoder 120 and the corresponding video decoder (e.g., video decoder 142) on the accessory device may be configured for a specific video frame size. For example, video encoder 120 and/or video decoder 142 may not be able to dynamically resize the video frame size that video encoder 120 and/or video decoder 142 are able to encode/decode. Because of this limitation, when the size of the video frame encoded/decoded by video encoder 120 and/or video decoder 142 changes, user device 110 and/or accessory device 140 may be required to tear down (e.g., destroy, terminate, delete, etc.) video encoder 120 and/or video decoder 142 and restart or rebuild video encoder 120 and/or video decoder 142 with the specifications of the new video frame size in order to reconfigure video encoder 120 and/or video decoder 142 to encode/decode video data having the new frame size.

To overcome the limitations of video encoder 120 and/or video decoder 142 described above, in some implementations, video encoder 120 and/or video decoder 142 may be configured with the maximum frame size (e.g., maximum GUI display area) allocated to user device 110 for presenting graphical user interfaces generated by user device 110. When sending the video frames for the graphical user interface generated by application 112 to accessory device 140, application 112 can specify the location and/or size of the graphical user interface within the video frame and include metadata in the video stream that indicates which area of the encoded video frames includes the graphical user interface generated by application 112. For example, when writing the graphical user interface to external display buffer 118, application 112 can store the metadata specifying the location and/or size of the graphical user interface in external display buffer 118 to be encoded with the video frames and sent to accessory device 140. Application 112 can also store the locations of interactive graphical elements (e.g. buttons, selectable items, menus, etc.) in the metadata so that when accessory device 140 receives user input corresponding to the identified locations, accessory device 140 can send the user input to user device 110 for processing, as described further below.

When the size and/or position of the graphical user interface changes within the video frame, application 112 can inform accessory device 140, through the video metadata, of the portions of the video frame that include the graphical user interface so that accessory device 140 can use the specified portions of the video frame to generate graphical user interfaces (e.g., a composite GUI) for presentation on accessory device 140. Thus, system 100 can stream graphical user interfaces of various dimensions from user device 110 to accessory device 140 through video encoder 120 and/or video decoder 142 without having to tear down and reconfigure video encoder 120 and/or video decoder 142.

In some implementations, system 100 can include accessory device 140. For example, accessory device 140 can be a computing device, such as a vehicle infotainment system, a tablet computer, a smartwatch, a television, or any other computing device. The descriptions herein will refer primarily to a vehicle infotainment system in the implementation examples, but accessory device 140 may be embodied in any type of computing device that is connected to a corresponding display device.

In some implementations, accessory device 140 can include application 142. For example, application 142 can be any type of software application supported by the operating system and/or hardware of accessory device 140. Application 142 can correspond to a user installed software application, such as a music application, messaging application, navigation application, etc. Application 142 can correspond to an original equipment manufacturer (OEM) application, such as a preinstalled music application, messaging application, navigation application, etc., installed by the manufacturer of accessory device 140 or installed by the manufacturer of the operating system of accessory device 140. Application 142 can correspond to the operating system of accessory device 140, or a portion thereof. For example, application 142 can correspond functions, accessories, daemons, utilities, etc., of the operating system that present desktop user interfaces, home screen user interfaces, and/or other graphical user interfaces of accessory device 140.

In some implementations, application 142 can be a different software application than application 112. For example, application 142 may correspond to software for providing functions and/or features specific to accessory device 140 (e.g., an in-car infotainment system providing features related to the corresponding automobile), while application 112 may correspond to software for providing functions and/or features specific to user device 110 (e.g., a smartphone device providing features related to telephony and/or messaging).

In some implementations, application 142 can be of a similar type, although not an identical application, as application 112. For example, application 142 may correspond to a navigation application built into an in-car infotainment system, while application 112 may correspond to a different navigation application installed on user device 110. As another example, application 142 may correspond to the operating system of accessory device 140 providing a graphical user interface for interacting with the operating system of accessory device 140 and other applications installed on accessory device 140, while application 112 may correspond to the operating system of user device 110 providing a graphical user interface for interacting with the operating system of user device 110 and other applications installed on user device 110.

In some implementations, accessory device 140 can include local display buffer 144. For example, when application 142 generates a graphical user interface for display locally on accessory device 140, application 142 can render the graphical user interface into local display buffer 144. Display 146 (or a display driver) can read the graphical user interface from local display buffer 144 and present the graphical user interface on display 146.

In some implementations, the graphical user interface generated by application 142, and written to local display buffer 144, can correspond to a graphical user interface of accessory device 140 (e.g., accessory device GUI). The accessory device GUI may, for example, only include graphical elements generated by accessory device 140 and/or the applications (e.g., application 142) running on accessory device 140. Stated differently, accessory device GUI may only include graphical elements originated by the operating system of accessory device 140 and/or the application installed thereon.

In some implementations, the graphical user interface generated by application 142, and written to local display buffer 144, can correspond to a composite graphical user interface. For example, the composite graphical user interface may be generated by application 142 by combining an accessory GUI with a graphical user interface (e.g., user device GUI) generated by user device 110 and/or application 112. For example, user device 110 may establish a connection with accessory device 140 through network 130 (e.g., a wired connection, ethernet over USB, a wireless network connection, Bluetooth connection, Wi-Fi connection, peer-to-peer connection, etc.). As described above, application 112 can generate a graphical user interface for presentation on an external display (e.g., accessory device 140), encode video frames representing the graphical user interface into a video stream using video encoder 120, and stream the video frames to accessory device 140.

In some implementations, accessory device 140 can include video decoder 148. For example, video decoder 148 can be configured to decode the video stream sent to accessory device 140 by user device 110 through network 130. Video decoder 148 can extract the metadata that specifies the size and/or location of the user device GUI written into the video frames by application 112, decode the received video frames, and store the decoded video frames, or portion thereof, in video stream buffer 150.

To generate the composite graphical user interface for display on accessory device 140, application 142 can read the video frames representing the user device GUI from video stream buffer 150. If the entire received video frame is decoded and stored in video stream buffer 150, application 142 obtain the metadata indicating a portion (e.g., size and/or location) of the video frame corresponding to the user device GUI and can crop the frame based on the size and location of the user device GUI within the video frame, as specified in the video stream metadata. Application 142 can then generate a composite GUI that includes a combination of graphical element features generated by accessory device 140 (e.g., an accessory device GUI) and the user device GUI extracted from the streamed video frames. For example, application 142 may generate an accessory device GUI that includes an area allocated for embedding the user device GUI into the accessory device GUI. When the user device GUI is received from user device 110, application 142 can embed the user device GUI into the accessory device GUI and present the resulting composite GUI on display 146 of accessory device 140.

The above description provides a general overview of the system 100 for coordinating adjustments to composite graphical user interfaces (GUIs) generated by multiple devices. The descriptions that follow provide additional details of system 100 that provide examples of how to coordinate adjustments to the composite graphical user interfaces and/or interactions between user device and accessory device.

Figure 2:
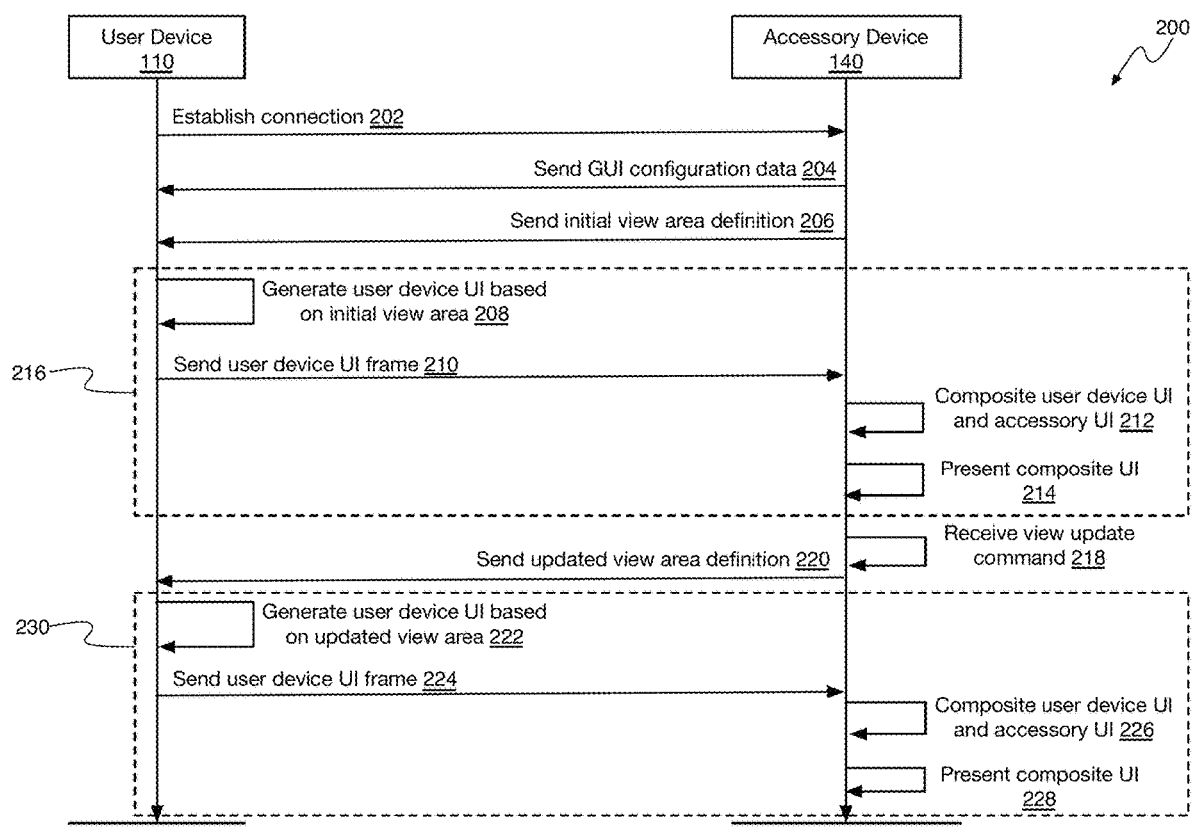
FIG. 2 is a system interaction diagram that illustrates example interactions between a user device and an accessory device for coordinating adjustments to composite graphical user interfaces generated by multiple devices.

FIG. 2 is a system interaction diagram 200 that illustrates example interactions between user device 110 and accessory device 140 for coordinating adjustments to composite graphical user interfaces generated by multiple devices.

At block 202, user device 110 can establish a connection to accessory device 140. For example, accessory device 140 can broadcast a message (e.g., over Bluetooth, Wi-Fi, etc.) indicating the availability of accessory device to receive streaming media from another device. User device 110 can receive the broadcast message and use the content of the message (e.g., device identifiers, protocol identifiers, other configuration data, etc.) to establish a connection to accessory device 140.

At block 204, user device 110 can receive GUI configuration data from accessory device 140 through the established connection. For example, the GUI configuration data can specify a maximum GUI display area (e.g., GUI display area) allocated for graphical user interfaces generated by user device 110. The GUI configuration can specify various view areas within the maximum GUI display area, allowed transitions between the view areas, and/or allowed transition types (e.g., animations) between the specified view areas. When user device 110 receives the GUI configuration data from accessory device 140, user device 110 can store the GUI configuration data and use the GUI configuration data to determine in which part of the GUI display area to write the user device GUI generated by user device 110. In response to receiving the GUI configuration data, user device 110 can generate and/or configure video encoder 120 to encode video frames having dimensions corresponding to the GUI display area specified in the received GUI configuration data. Similarly, accessory device 140 can generate and/or configure video decoder 148 to decode video frames having dimensions corresponding to the specified GUI display area.

At block 206, user device 110 can receive an initial view area definition from accessory device 140. For example, accessory device 140 can send information specifying into which of the view areas identified in the GUI configuration data user device 110 should render the user device GUI. For example, each of the various view areas may be defined by a location (e.g., upper left corner of a view area rectangle) within the GUI display area and dimensions (e.g., height/width, upper left corner/lower right corner, etc.) that specify the size of the view areas. Each of the various view areas may be assigned a corresponding identifier (e.g., 1, 2, 3, A, B, C, etc.). Thus, accessory device 140 may specify the initial view area into which user device 110 should render the user device GUI by providing the corresponding view area identifier to user device 110 (e.g., application 112).

At block 208, user device 110 can generate the user device GUI based on the initial view area. For example, application 112 can configure external display buffer 118 to be of the same size as the GUI display area specified in the GUI configuration received from accessory device 140. When application 112 receives the initial view area definition (e.g., the location and size parameters, or the view area identifier), application 112 can determine the location and size of the initial view area within external display buffer 118 based on the location and size of the initial view area. Application 112 can then write the user device GUI into the portion of external display buffer 118 that corresponds to the location and size of the initial view area. For example, the initial view area can correspond to the GUI display area or a fraction of the GUI display area (e.g., less than all of the GUI display area). The particular user device GUI (e.g., the particular graphical user interface, interface elements, supported interactions, etc.) will of course depend on the current operating context of user device 110 and/or accessory device 140.

At block 210, user device 110 can send the user device GUI frames to accessory device 140. For example, video encoder 120 can generate and encode frames of video having a size and/or dimensions of the GUI display area based on the GUI data in external display buffer 118. Thus, the user device GUI may fill the entire video frame or a portion (e.g., less than all) of the video frame depending on which view area the user device GUI was written into. After encoding the video frames corresponding to external display buffer 118, user device 110 can send the encoded video frames, and metadata specifying the parameters (e.g., dimensions of the GUI, locations of interactive graphical elements, etc.) of the user device GUI, to accessory device 140.

At block 212, accessory device 140 can generate a composite GUI based on the user device GUI and the accessory device GUI. For example, accessory device 140 can embed, or combine, the user device GUI received in the streamed video frames with the accessory device GUI generated by accessory device 140. More specifically, for each frame of video written to local display buffer 144 by application 142 and presented on display 146, application 142 can generate a video frame in local display buffer 144 that includes the accessory device GUI and the portion of the video frame received from user device 110 that includes the user device GUI generated by application 112. Application 142 can, for example, crop the video frame received from user device 110 and decoded by video decoder 148 into video stream buffer 150 down to the portion of the video frame corresponding to the location and area of the video frame identified in the metadata and corresponding to the user device GUI generated by application 112, as described above.

At block 214, accessory device 140 can present the composite graphical user interface written to local display buffer 144 on display 146. For example, a display driver running on accessory device 140 can read the video frame data in local display buffer 144 and cause the video frame data, including the composite GUI, to be presented by display 146 connected to accessory device 140.

At block 216, blocks 208, 210, 212, and/or 214 can be repeated for each frame of video streamed from user device 112 and/or generated by accessory device 140. To generate a sequence of composite GUI frames (e.g., a video, an animation, etc.) that represents a graphical user interface generated by both user device 110 and accessory device 140 and changes to the composite GUI as the operating context of user device 110 and/or accessory device 140 changes over time.

At block 218, accessory device 140 can receive a view update command. For example, accessory device 140 can receive a view update command through a user input received by accessory device 140 through an accessory device GUI (e.g., part of the composite GUI or presented independently) presented on display 146. Accessory device 140 can receive a view update command in response to accessory device 140 detecting a change in operating context of accessory device 140 and/or user device 110. Accessory device 140 can receive a view update command from user device 110, as described further below. In response to receiving the view update command, accessory device 140 can determine a view area appropriate for the view update command. For example, the view update command may indicate that the view area allocated for presenting the user device GUI should change from the current view area (e.g., initial view area) to a different view area (e.g., target view area) to allow the accessory device GUI to occupy more or less space within the composite GUI. After determining the target view area, accessory device 140 (e.g., application 142) can determine the identifier corresponding to the target view area.

At block 220, accessory device 140 can send an updated view area definition to user device 110. For example, the updated view area definition can identify to which view area user device 110 should transition for generating user device GUIs within the streamed video frame. For example, accessory device 140 can send a view update command to user device 110 through network 130 that includes the identifier corresponding to the view area to which the user device GUI should transition. Alternatively, accessory device 140 can send a view update command to user device 110 through network 130 that identifies the location and size of the view area to which the user device GUI should transition.

At block 222, user device 110 can generate the user device GUI based on the updated view area. For example, since application 112 has already configured external display buffer 118 to be of the same size as the GUI display area specified in the GUI configuration received from accessory device 140, when application 112 receives the updated view area definition (e.g., the location and size parameters, or the view area identifier), application 112 can determine the location and size of the updated view area within the existing external display buffer 118 based on the location and size of the updated view area. Application 112 can then write the user device GUI into the portion of external display buffer 118 that corresponds to the location and size of the updated view area. For example, the updated view area can correspond to the GUI display area or a fraction of the GUI display area (e.g., less than all of the GUI display area). The updated view area may correspond to a different location, size, and/or orientation within external display buffer 118, as described further below. The particular user device GUI (e.g., the particular graphical user interface, interface elements, supported interactions, etc.) will of course depend on the current operating context of user device 110 and/or accessory device 140.

At block 224, user device 110 can send the user device GUI frames to accessory device 140. For example, video encoder 120 can generate and encode frames of video having a size and/or dimensions of the GUI display area based on the GUI data in external display buffer 118. Thus, the user device GUI may fill the entire video frame or a portion (e.g., less than all) of the video frame depending on which view area the user device GUI was written into. After encoding the video frames corresponding to external display buffer 118, user device 110 can send the encoded video frames, and metadata specifying the parameters (e.g., dimensions of the GUI, locations of interactive graphical elements, etc.) of the user device GUI, to accessory device 140.

At block 226, accessory device 140 can generate a composite GUI based on the user device GUI and the accessory device GUI. For example, accessory device 140 can embed, or combine, the user device GUI received in the streamed video frames with the accessory device GUI generated by accessory device 140. More specifically, for each frame of video written to local display buffer 144 by application 142 and presented on display 146, application 142 can generate a video frame in local display buffer 144 that includes the accessory device GUI and the portion of the video frame received from user device 110 that includes the user device GUI generated by application 112. Application 142 can, for example, crop the video frame received from user device 110 and decoded by video decoder 148 into video stream buffer 150 down to the portion of the video frame corresponding to the location and area of the video frame identified in the metadata and corresponding to the user device GUI generated by application 112, as described above.

At block 228, accessory device 140 can present the composite graphical user interface written to local display buffer 144 on display 146. For example, a display driver running on accessory device 140 can read the video frame data in local display buffer 144 and cause the video frame data, including the composite GUI, to be presented by display 146 connected to accessory device 140.

At block 230, blocks 222, 224, 226, and/or 228 can be repeated for each frame of video streamed from user device 112 and/or generated by accessory device 140. To generate a sequence of composite GUI frames (e.g., a video, an animation, etc.) that represents a graphical user interface generated by both user device 110 and accessory device 140 and changes to the composite GUI as the operating context of user device 110 and/or accessory device 140 changes over time.

Animating View Area Transitions

In some implementations, transitions between view areas allocated to the user device GUI can be animated to provide a visually gradual transition between view areas. For example, instead of instantly switching from one view area to another view area, application 112 of user device 110 can gradually expand or contract the current view area incrementally with each video frame generated by user device 110 so that when the user device GUI represented in the video frame is presented by accessory device 140 the current view area appears to grow, shrink, or gradually transform into the updated view area. This animation (e.g., the growing, shrinking, transforming) of the current view area into the updated view area can be coordinated with accessory device 140 (e.g., application 142) by providing the location and size of the intermediate (e.g., incremental, transitional, etc.) view areas as the current view area is transformed into the updated view area. When accessory device 140 receives the streamed user device GUI video frames and metadata, application 142 can adjust the accessory device GUI in concert with the changes made to the user device GUI based on the metadata that identifies the location and size of the user device GUI within the streamed video frames to generate a composite GUI that is animated to show the transition between different view areas allocated to the user device GUI.

Figure 3:
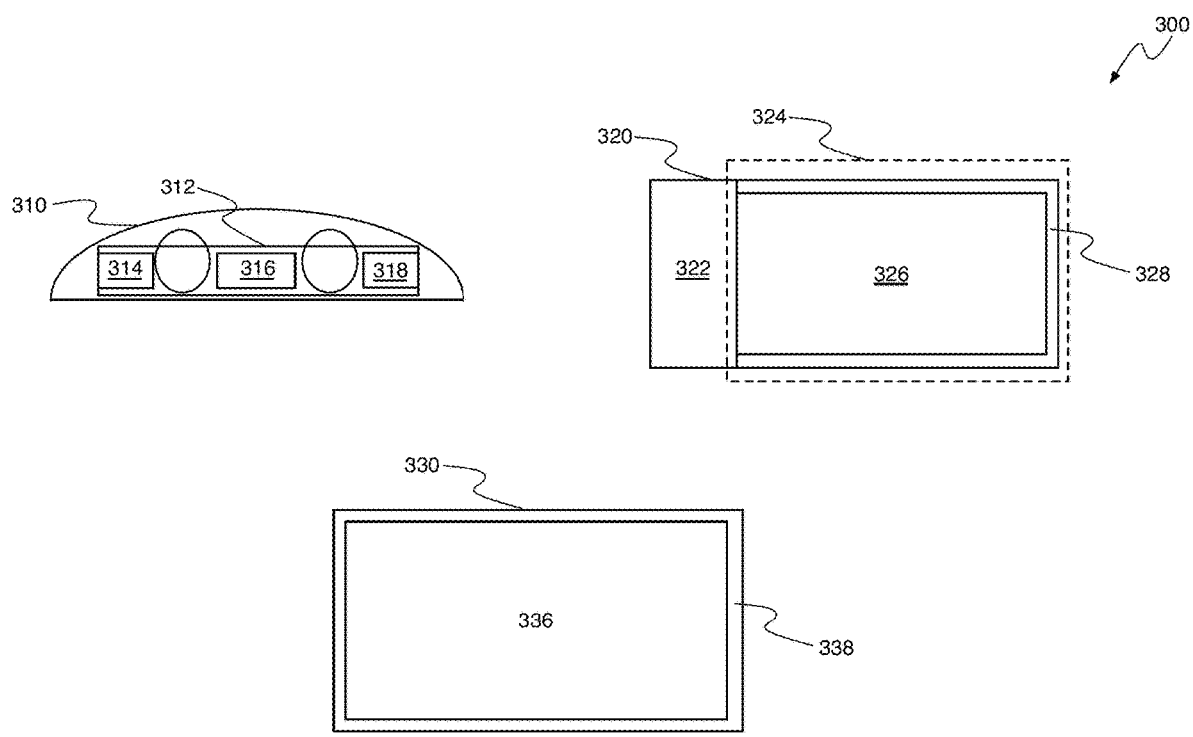
FIG. 3 illustrates examples of various composite graphical user interface configurations.

FIG. 3 illustrates examples of various composite graphical user interface configurations 300. For example, accessory device 140 (e.g., an in-car infotainment system) may present composite graphical user interfaces on various types of display devices that have various purposes, configurations, and/or dimensions. The screen areas provided by the display devices may include screen area portions that are strictly reserved for presenting graphical user interface elements generated by accessory device 140. The screen areas provided by the display devices may include dynamic screen area portions that may be adjusted to present an accessory device GUI, a user device GUI, or a combination thereof. These dynamic screen area portions can correspond to the GUI display area, described above. As also described above, accessory device 140 can specify or allocate various view areas within the GUI display area into which the user device GUI and/or accessory device GUI can be rendered and/or dynamically adjusted based on user input or other context associated with user device 110 and/or accessory device 140.

In some implementations, accessory device 140 can specify safe areas within each corresponding view area. For example, a safe area can be a portion of the corresponding view area that is unobstructed by bezels, instrumentation, or other features that may impair the user's ability to view and/or interact with the graphical elements presented within the corresponding view area. In the in-car infotainment example, a driver's view of the infotainment screen may be partially obscured by a bezel around the infotainment system screen, or by various controls presented around the infotainment system screen. The car manufacturer and/or the infotainment system manufacturer may identify portions of the infotainment system screen that are unobscured as safe areas within the corresponding view area. User device 110 can be configured to generate graphical user interfaces within the safe areas and unsafe areas of the view area, but user device 110 can be configured to present important information, controls, or other graphical elements within the designated safe areas so that they can be easily seen by the user. These safe areas can be specified by accessory device 140 along with the view areas and GUI display area in the GUI configuration data received by user device 110 at block 204 described above with reference to FIG. 2. The paragraphs that follow illustrate various example configurations for the screen area, the GUI display area, the view areas, and the safe areas described above.

FIG. 3 illustrates example screen areas, view areas, and safe areas for presenting composite graphical user interfaces. For example, many modern automobiles include a display screen 310 in the dash of the automobile that present representations of traditional analog gauge clusters (e.g., speedometer, tachometer, temperature gauge, trip odometer, etc.). In some implementations, a portion of display screen 310 can be allocated for presenting composite graphical user interfaces generated by accessory device 140 and/or user device 110. For example, within the allocated portion (e.g., GUI display area 312), accessory device 140 can specify view areas 314, 316, 318 within which user device 110 can generate the user device GUI. These view areas 314, 316, 318 can correspond to the entire GUI display area 312 or a portion (e.g., less than all) of GUI display area 312, as represented by view areas 314, 316, 318. The view areas can be allocated in such a way as to avoid interfering with screen areas that may be used for other purposes, such as the presentation of various instruments and gauges of an automobile.

The location and/or dimensions of GUI display area 312, each of the view areas 314, 316, 319, the view area identifiers, and each of the safe areas determined for view areas 314, 316, 319 can be sent to user device 110 in the GUI configuration data described with reference to FIG. 2. Each of the view areas may have a corresponding identifier that can be used to identify and/or communicate the initial, updated, and/or currently selected view area between user device 110 and accessory device 140 to reduce the amount of data that is transmitted between device when adjusting the composite GUI. For example, based on the context of the automobile, accessory device 140, and/or user device 110, accessory device 140 may change, or update, the view area used to present the composite GUI between view area 314, view area 316, and/or view area 318.

In some implementations, accessory device 140 may identify, or user device 110 can request, multiple view areas to be used simultaneously. For example, accessory device 140 may communicate to user device 110 that user device 110 can generate a user device GUI in both view area 314 and view area 318. User device 110 can then generate a first portion of the user device GUI in view area 314 and a second portion of the user device GUI in view area 318.

FIG. 3 includes an example GUI display area 320. For example, accessory device 140 can allocate display area 320 for presenting a composite GUI on a display screen of accessory device 140. Accessory device 140 can send a message to user device 140 indicating that user device 110 should generate a user device GUI in view area 324 of display area 320 so that accessory device 140 can generate an accessory device GUI in area 322, thereby presenting a composite GUI within display area 320. Within view area 324 allocated to user device 110 for presentation of the user device GUI, accessory device 140 can identify a safe area 326 and/or unsafe area 328 so that user device 110 can render important graphical elements of the user device GUI into safe area 326 giving the user an unobstructed view and/or access to important graphical elements of the user device GUI. For example, safe area 326 and/or unsafe area 328 can be determined and/or specified in such a way that any graphical element presented in safe area 26 will not be obstructed by the physical characteristics of the accessory device or nearby physical environment (e.g., physical features and/or characteristics of the inside of an automobile).

FIG. 3 includes an example GUI display area 330. In the example display area 330, the view area allocated to the user device GUI corresponds to the entire display area. However, this arrangement is still considered a composite GUI since the user device GUI is embedded in GUI generated by accessory device 140. In this case, the area allocated by accessory device 140 to user device 110 for generating and/or presenting the GUI includes the entire composite GUI display area. As described above, view area 330 includes safe area 336 and/or unsafe area 338. For example, the safe area 336 and/or unsafe area 338 can be configured such that a bezel (or other physical feature) around display area 330 will not obstruct the user's view of graphical elements presented in safe area 336.

Figure 4:
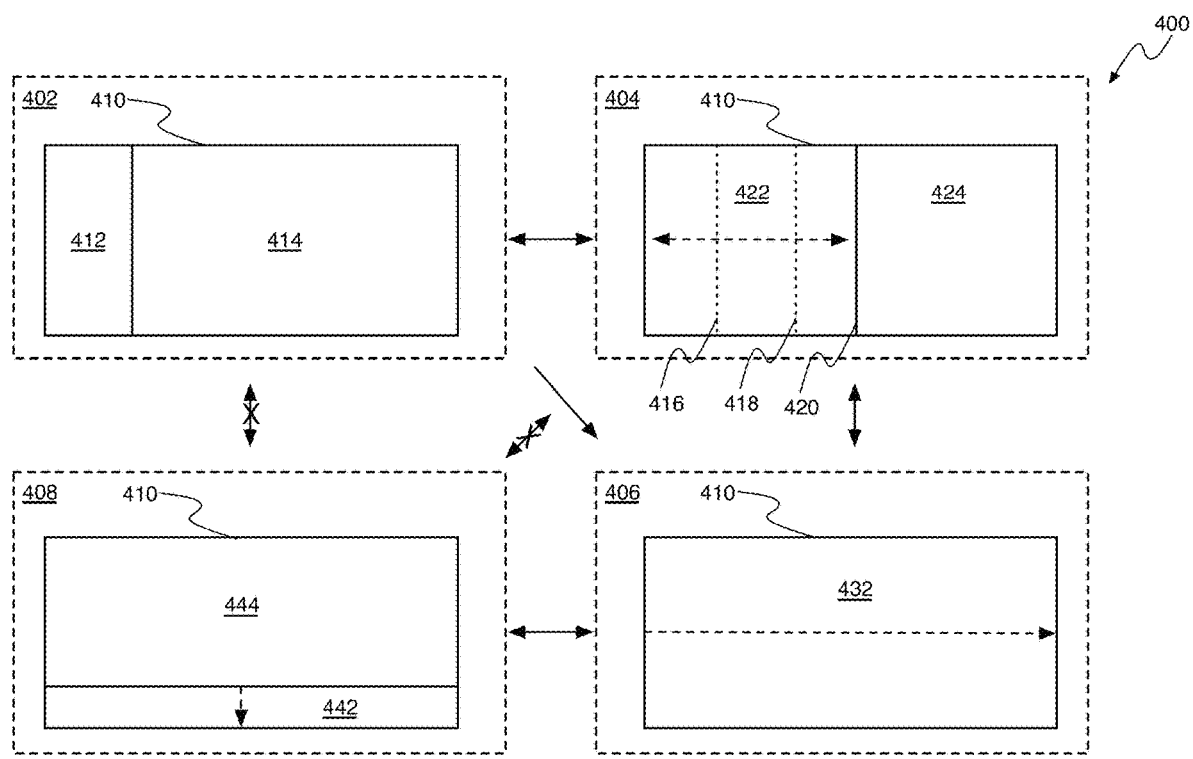
FIG. 4 is a drawing illustrating transitions between various view areas.

FIG. 4 is a drawing 400 illustrating transitions between various view areas. For example, accessory device 140 can send user device 110 size and location parameters defining, or specifying, various view areas within a GUI display area, as described above. As described above, each view area definition can include a location (e.g., rectangle corner location) within the GUI display area, a size (e.g., height/width, opposing corner locations, etc.), a safe area within the view area, and/or a view area identifier. The GUI configuration provided by accessory device 140 to user device 110 can specify allowed transitions between the various view areas. For example, if accessory device 140 defines view areas A, B, C, and D. Accessory device 140 can specify that a transition from view area A to view area B is allowed, but a transition from view area A to view area D is not allowed. User device 110 may use this allowed transition information to determine which view area transitions are allowed when requesting an update or change to the current view area from accessory device 140, as described further below.

Drawing 400 illustrates GUI display area states 402, 404, 406 and 408 depicting transitions between different view areas. As illustrated by drawing 400, transitions between display area state 402 and display area states 404 and 406 are allowed, as indicated by the arrows between states. As illustrated by drawing 400, transitions between display area state 408 and display area states 402 and 404 are not allowed, as indicated by the crossed-out arrows (e.g., arrows with 'X' in the middle) between states. In some implementations, an allowed transition can be bidirectional. For example, as illustrated by the double arrow between state 402 and state 404, system 100 can transition from state 402 to state 404 and from state 404 to state 402. In some implementations, an allowed transition can be unidirectional. For example, as illustrated by the single arrow from state 402 to state 406, system 100 can transition from state 402 to state 406, but not from state 406 to state 402.

In the examples of FIG. 4, display area state 402 includes composite GUI display area 410 including user device GUI view area 412 and accessory device GUI area 414. View area 412 can be, for example, the initial view area specified by accessory device 140 for user device 110 to use when generating the user device GUI, as described above. When accessory device 140 sends user device 110 an updated view area (e.g., view area 422), user device 110 can transition from the initial view area 412 to the updated view area 422. For example, after receiving the command from accessory device 140 to update the view area, user device 110 can render the user device GUI into the area of external display buffer 118 (e.g., sized correspondingly to GUI display area 410) corresponding to view area 422, as described above.

In some implementations, the transitions between view areas can be animated so that the view areas appear to gradually expand or contract from a current view area (e.g., view area 412) to the updated view area (e.g., view area 422). For example, when transitioning from view area 412 to view area 422, user device 110 can incrementally expand (e.g., as indicated by lines 416, 418, 420) view area 412 until the user device GUI occupies the location and dimensions within GUI display area 410 corresponding to view area 422. For example, with each user device GUI frame that is generated by user device 110 for streaming to accessory device 140, user device 110 can expand the user device GUI presented in view area 412 until the user device GUI occupies the location and area corresponding to view area 422. As user device 110 makes the incremental expansions of view area 412, user device 110 can indicate the size and location of each increment in the video frame metadata so that accessory device 140 can make corresponding incremental changes to the accessory device GUI (e.g., presented in areas 414, 424, 444) and present a coordinated view area transition animation. For example, as user device view area 412 expands to become user device view area 422, accessory device GUI area 414 can shrink in coordination with the expansion of user device GUI view area 412 to become accessory device GUI area 424. Similarly, when transitioning from view area 422 to view area 412, user device 110 can incrementally contract or shrink (e.g., as indicated by lines 416, 418, 420) view area 422 until the user device GUI occupies the location and dimensions within GUI display area 410 corresponding to view area 412.

As illustrated by example display area state 406, in some cases, the view area allocated to the user device GUI within GUI display area 410 can correspond to the entire GUI display area 410. For example, accessory device 140 may send a command to user device 110 to transition from view area 412 or view area 422 to view area 432 that corresponds to the entirety of composite GUI display area 432. As indicated by the single arrow between display area state 402, accessory device 140 has been configured to allow a one-way transition from view area 412 to view area 432, but not from view are 432 to view area 412. When the transition rules (e.g., allowed transitions mappings) are transmitted to user device 110, user device 110 and/or accessory device 140 may be configured to avoid making or requesting disallowed transitions. If accessory device 140 receives a request from user device 110 requesting a disallowed transition between view areas, accessory device 140 can respond to user device 110 with an error indicating a disallowed transition between view areas.

As illustrated by example display area state 408, in some cases, the view area allocated to the user device GUI may not have an allowed transition between other defined view areas for the user device GUI. For example, the GUI configuration data provided to user device 110 by accessory device 140 may define a maximum GUI display area 410 and user device GUI view areas 412, 422, 432, and 442. However, the transition mapping data provided by accessory device 140 in the GUI configuration data may disallow transitions between view area 442 and view areas 412 and 422 (e.g., as indicated by the crossed-out arrows having an 'X'). These transitions may be disallowed for various reasons having to do with the functionality presented by the user device GUI or the accessory device GUI or simply because such a transition might be visually awkward, such as the example presented in FIG. 4. For example, the transition between the horizontally arranged view area 442 to the vertically arranged view area 412 may present a visually awkward transition.

Figure 5:
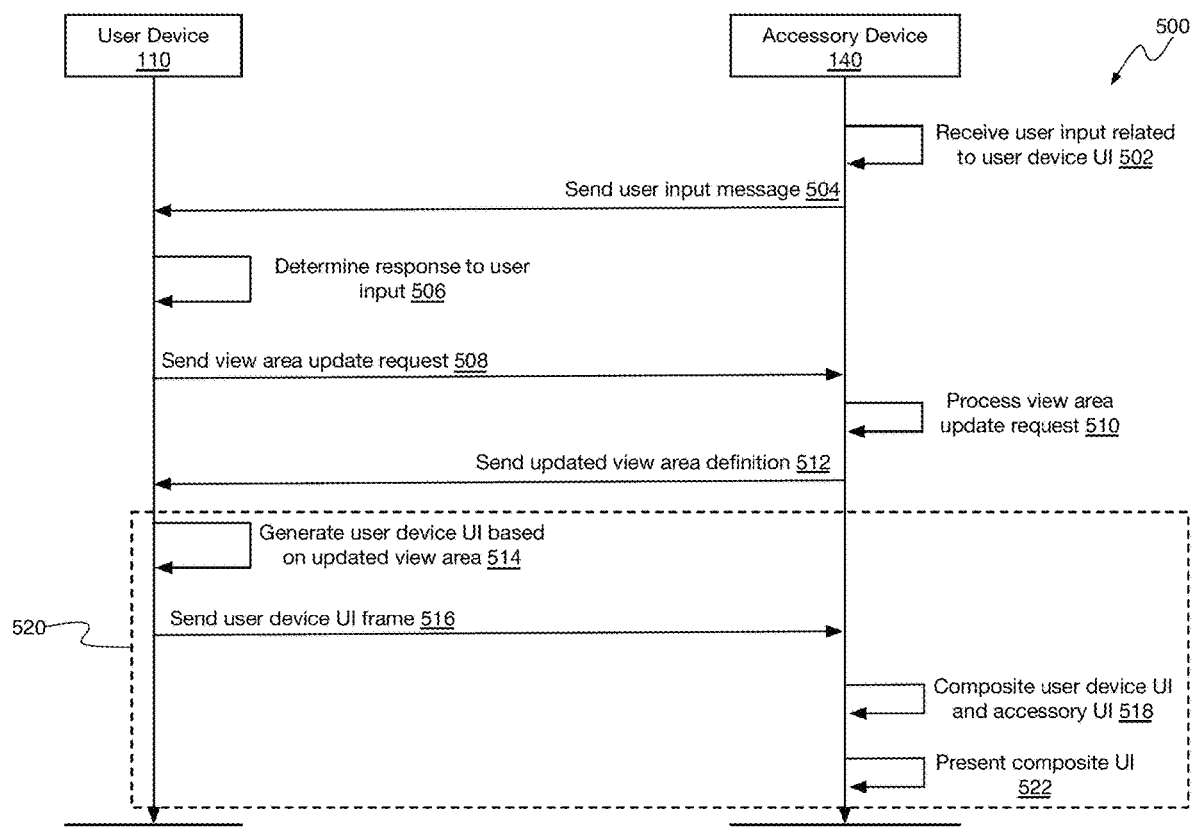
FIG. 5 is a system interaction diagram that illustrates example interactions between a user device and an accessory device for coordinating adjustments to composite graphical user interfaces in response to user input to a user device GUI.

FIG. 5 is a system interaction diagram 500 that illustrates example interactions between user device 110 and accessory device 140 for coordinating adjustments to composite graphical user interfaces in response to user input to a user device GUI. For example, when accessory device 140 receives user input with respect to a user device GUI presented by accessory device 140, accessory device 140 can send the user input to user device 110 for processing. In some cases, the user input may cause user device 110 to request a view area update from accessory device 140 so that an appropriate user device GUI can be presented in response to the user input. In some implementations, the processing blocks detailed in diagram 500 can be combined with the processing blocks detailed in diagram 200. For example, block 502 of diagram 500 may be performed after presenting a composite GUI, as described in block 214 and/or block 230 of FIG. 2.

At block 502, accessory device 140 can receive user input related to a user device GUI presented by accessory device 140. For example, accessory device 140 may present a composite GUI that includes an accessory device GUI and/or a user device GUI. If user input is received with respect to graphical elements presented by the accessory device GUI, accessory device 140 can process the user input and/or adjust the composite GUI in response to the user input. However, when the user input is received with respect to graphical elements presented by the user device GUI, accessory device 140 can send the user input to user device 110 for processing. For example, accessory device 140 can determine a location and/or a graphical element corresponding to a location on the user device GUI where the user input was received and send a user input message to user device 110 indicating the location and/or graphical element corresponding to the user input at step block.

At block 506, user device 110 can determine a response to the user input. For example, user device 110 can receive the user input message from accessory device 140 and determine, based on the location of the user input and/or the graphical element corresponding to the user input, an action or function to perform in response to the user input. In some cases, the determined response may cause user device 110 transition from a current view area to an updated view area. For example, if the user input is related to a graphical element presented on the user device GUI for causing the user device GUI to become maximized, user device 110 can determine a view area having the maximum display area.

At block 508, user device 110 can send a view area update request to accessory device 140. For example, user device 110 can send a view area update request to accessory device 140 requesting a transition from the current view area to the view area determined at block 506. In some implementations, before making the view area update request, user device 110 can determine whether the transition from the current view area to the determined view area is allowed based on the GUI configuration data previously received from accessory device 140, as described above. If the transition from the current view area to the determined view area is allowed, user device 110 can send the view area update request. If the transition from the current view area to the determined view area is not allowed, user device 110 may not the view area update request and, instead, cause an error message to be presented on the user device GUI.

At block 510, accessory device 140 can process the view area update request received from user device 110. For example, when the view area update request is received, accessory device 140 can determine if the transition from the current view area to the requested view area is allowed. If the transition from the current view area to the determined view area is not allowed, accessory device 140 can send an error response to user device 110 indicating that the transition from the current view area to the requested view area is not allowed. When user device 110 receives the error response, user device 110 can present an error message on the user device GUI. If the transition from the current view area to the determined view area is allowed, accessory device 140 can send an updated view area definition at block 512.

At block 512, accessory device 140 can send an updated view area definition to user device 110. For example, the updated view area definition can identify the view area requested by user device 110 as the view area to which user device 110 should transition for generating user device GUIs within the streamed video frame. For example, accessory device 140 can send a view update command to user device 110 through network 130 that includes the identifier corresponding to the view area to which the user device GUI should transition. Alternatively, accessory device 140 can send a view update command to user device 110 through network 130 that identifies the location and size of the view area to which the user device GUI should transition.

At block 514, user device 110 can generate the user device GUI based on the updated view area. For example, since application 112 has already configured external display buffer 118 to be of the same size as the GUI display area specified in the GUI configuration received from accessory device 140, when application 112 receives the updated view area definition (e.g., the location and size parameters, or the view area identifier), application 112 can determine the location and size of the updated view area within the existing external display buffer 118 based on the location and size of the updated view area. Application 112 can then write the user device GUI into the portion of external display buffer 118 that corresponds to the location and size of the updated view area. For example, the updated view area can correspond to the GUI display area or a fraction of the GUI display area (e.g., less than all of the GUI display area). The updated view area may correspond to a different location, size, and/or orientation within external display buffer 118, as described further below. The particular user device GUI (e.g., the particular graphical user interface, interface elements, supported interactions, etc.) will of course depend on the current operating context of user device 110 and/or accessory device 140.

At block 516, user device 110 can send the user device GUI frames to accessory device 140. For example, video encoder 120 can generate and encode frames of video having a size and/or dimensions of the GUI display area based on the GUI data in external display buffer 118. Thus, the user device GUI may fill the entire video frame or a portion (e.g., less than all) of the video frame depending on which view area the user device GUI was written into. After encoding the video frames corresponding to external display buffer 118, user device 110 can send the encoded video frames, and metadata specifying the parameters (e.g., dimensions of the GUI, locations of interactive graphical elements, etc.) of the user device GUI, to accessory device 140.

At block 518, accessory device 140 can generate a composite GUI based on the user device GUI and the accessory device GUI. For example, accessory device 140 can embed, or combine, the user device GUI received in the streamed video frames with the accessory device GUI generated by accessory device 140. More specifically, for each frame of video written to local display buffer 144 by application 142 and presented on display 146, application 142 can generate a video frame in local display buffer 144 that includes the accessory device GUI and the portion of the video frame received from user device 110 that includes the user device GUI generated by application 112. Application 142 can, for example, crop the video frame received from user device 110 and decoded by video decoder 148 into video stream buffer 150 down to the portion of the video frame corresponding to the location and area of the video frame identified in the metadata and corresponding to the user device GUI generated by application 112, as described above.

At block 522, accessory device 140 can present the composite graphical user interface written to local display buffer 144 on display 146. For example, a display driver running on accessory device 140 can read the video frame data in local display buffer 144 and cause the video frame data, including the composite GUI, to be presented by display 146 connected to accessory device 140.

At block 520, blocks 514, 516, 518, and/or 522 can be repeated for each frame of video streamed from user device 112 and/or generated by accessory device 140. To generate a sequence of composite GUI frames (e.g., a video, an animation, etc.) that represents a graphical user interface generated by both user device 110 and accessory device 140 and changes to the composite GUI as the operating context of user device 110 and/or accessory device 140 changes over time.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 6:
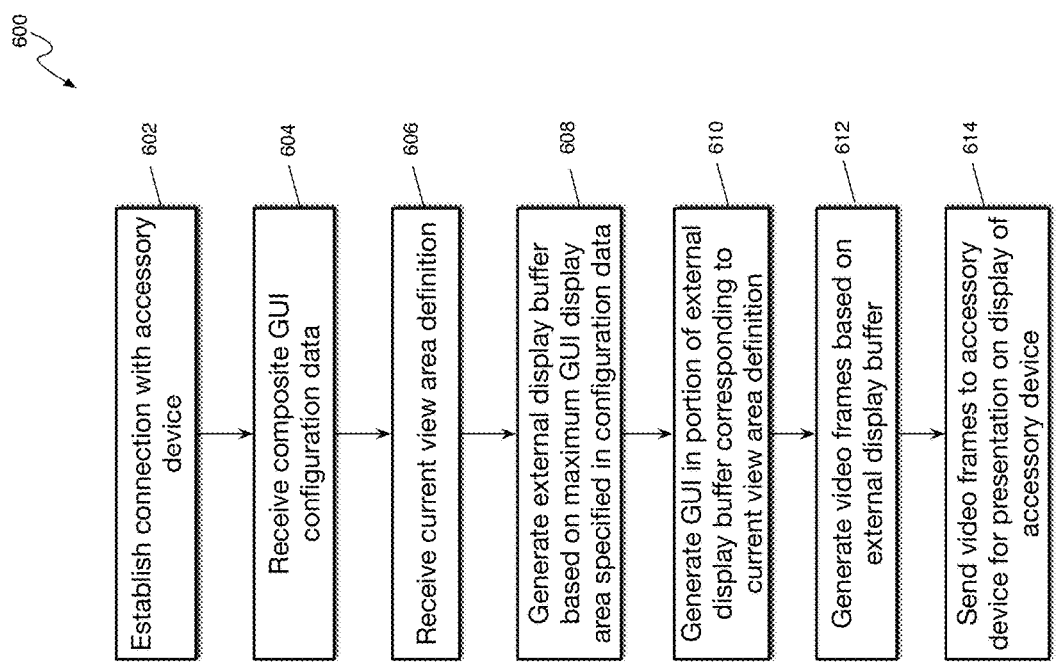
FIG. 6 is flow diagram of an example process for coordinating adjustments to composite graphical user interfaces at a user device.

FIG. 6 is flow diagram of an example process 600 for coordinating adjustments to composite graphical user interfaces at a user device. For example, process 600 may be performed by a user device to generate user device GUIs of various dimensions and coordinate the presentation of the user device GUIs in a composite GUI with an accessory device.

At step 602, user device 110 can establish a connection with accessory device 140. For example, accessory device 140 may broadcast the availability of accessory device 140 to present user device graphical user interfaces and/or composite graphical user interfaces. User device 110 may receive the broadcast message and establish a connection with accessory device 140 using information identifying accessory device 140 and/or other networking information contained within the broadcast message.

At step 604, user device 110 can receive composite GUI configuration data. For example, user device 110 can receive from accessory device 140 configuration data that defines the maximum GUI display size allocated to the composite GUI, various view areas into which user device 110 may generate a user device GUI, view area transition rules indicating allowable view area transitions, and/or other GUI configuration data as may be described herein.

At step 606, user device 110 can receive a current view area definition. For example, user device 110 can receive from accessory device 140 a view area identifier that identifies a current view area into which user device 110 can render the user device GUI. User device 110 can use the identifier to determine the view area definition (e.g., location and/or size within the GUI display area) for the current view area. Alternatively, user device 110 can receive the location and/or size of the current view area into which user device 110 can generate the user device GUI.

At step 608, user device 110 can generate an external display buffer based on the maximum GUI display area specified in the GUI configuration data. For example, the external display buffer and/or the video encoder used by user device 110 for generating the user device GUI and streaming video frames can be configured based on the maximum GUI display area (e.g., dimensions) specified in the GUI configuration data. By configuring the external display buffer and/or the video encoder based on the maximum GUI display area, user device 110 can render user device GUIs of various sizes, locations, dimensions, etc. within the maximum GUI display area without having to tear down and/or reconfigure the external display buffer and/or video encoder. Similarly, accessory device 140 can configure its video decoder to process video frames sized correspondingly to the maximum GUI display area so that the accessory device video decoder can process user device GUIs of various sizes, locations, dimensions, etc. within the maximum GUI display area without having to tear down and/or reconfigure the video decoder.

At step 610, user device 110 can generate a GUI in a portion of the external display buffer corresponding to the current view area definition. For example, user device 110 can size the user device GUI according to the dimensions of the current view area definition and locate the user device GUI at a location corresponding to the current view area definition within the maximum GUI display area (e.g., within the external display buffer). When the current view area definition identifies a corresponding safe area within the current view area, user device 110 can generate important user device GUI graphical elements, features, and/or information within the safe area of the current view area. For example, user device 110 can determine that the current view area definition includes a safe area and render important user device GUI element that a user would need to view and/or interact with within the safe area of the current view area. In some implementations, user device 110 can generate and/or store metadata for the user device GUI that includes the size and location where the user device GUI was generated, or rendered, within the external display buffer (e.g., maximum GUI display area). Thus, if the size and/or location of the user device GUI differs from the size and/or location of the current view area, or updated view area, such as when animating a transition between view areas, accessory device 140 can determine the size and/or location of the user device GUI based on the metadata.

At step 612, user device 110 can generate video frames based on the external display buffer. For example, user device 110 can use video encoder 120 configured to generate video frames having a size corresponding to the dimensions of the maximum GUI display area to generate video frames that include the data stored in the external display buffer. Thus, the video frames may include the user device GUI rendered into the external display buffer and any "empty" space within the maximum GUI display area not associated with the current view area occupied by the user device GUI.

At step 614, user device 110 can send the generated video frames to accessory device 140 for presentation on a display of the accessory device. For example, user device 110 can send the encoded frames of video corresponding to the external display buffer (e.g., including the user device GUI) and the user device GUI metadata that defines the size and/or location where the user device GUI is located within the maximum GUI display area or external display buffer. Accessory device 140 can use the metadata to decode the video frames and extract the user device GUI from the video frames. For example, accessory device 140 can crop the image in the received video frames to the size and/or location of the user device GUI to obtain the user device GUI image and incorporate the user device GUI image into a composite GUI generated by accessory device 140. Accessory device 140 can then present the composite GUI on a display of accessory device 140, as described above.

Figure 7:
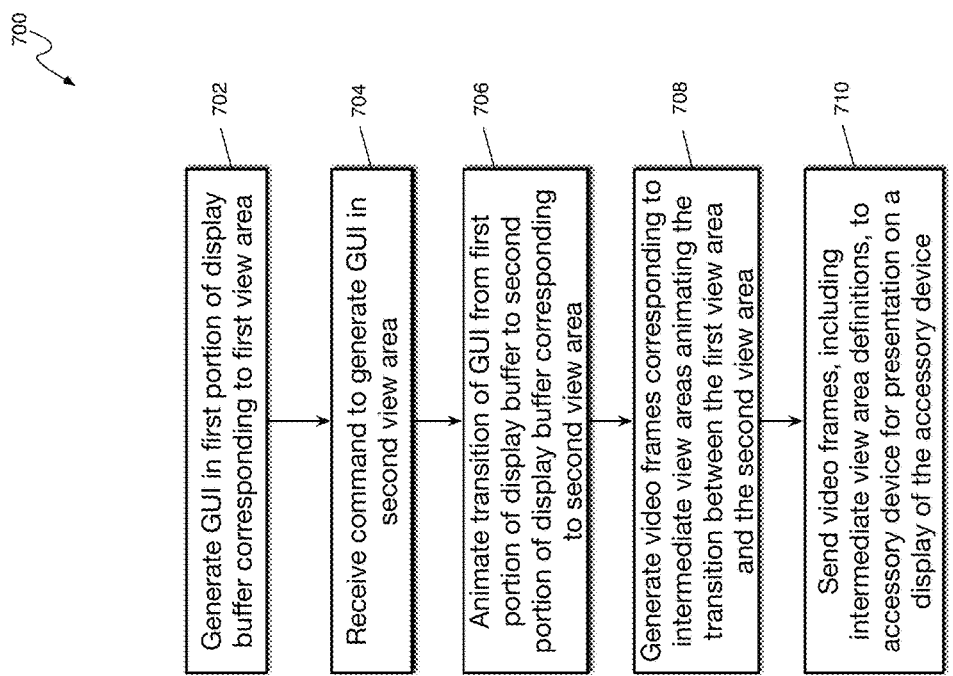
FIG. 7 is flow diagram of an example process for coordinating transition animations for composite graphical user interfaces at a user device.

FIG. 7 is flow diagram of an example process 700 for coordinating transition animations for composite graphical user interfaces at a user device. For example, process 700 may be performed by user device 110 to animate transitions between a current view area and an updated view area (e.g., next view area, new view area, etc.) by rendering user device GUIs into incrementally expanding or contracting intermediate, or transitional, view areas and coordinating these transitions with accessory device 140 by indicating to accessory device 140 the size and/or location of these intermediate, transitional view areas.

At step 702, user device 110 can generate a GUI in a first portion of an external display buffer corresponding to a first view area. For example and as described above, user device 110 can generate an external display buffer and/or video encoder configured for the maximum GUI display size specified by accessory device 140 in the GUI configuration data provided by accessory device 140. The GUI configuration data can also define various view areas within the maximum GUI display size for rendering user device graphical user interfaces. Accessory device 140 can specify a current view area for user device 110 to use when rendering a user device GUI. User device 110 can generate, or render, a user device GUI into a first portion of the external display buffer corresponding to the current view area.

At step 704, user device 110 can receive a command from accessory device 140 to generate a user device GUI in a second view area. For example, a context change, user input, or request from user device 110 can cause accessory device to specify an updated view area (e.g., second view area) into which user device 110 should render the user device GUI, as described above.

At step 706, user device 110 can animate a transition of the user device GUI from the first portion of the display buffer to a second portion of the display buffer corresponding to the second view area. For example, the transition can be an immediate switch, or jump, between the first portion and the second portion of the display buffer (e.g., maximum GUI display area). The transition can be an incremental animation where the user device GUI gradually expands, or contracts, from the first view area to the second view area through intermediate view areas used or generated by user device 110 for the transition animation.

At step 708, user device 110 can generate video frames corresponding to the intermediate view areas animating the transition from the first view area to the second view area. For example, the intermediate view areas can be dynamically generated based on the amount of time allocated for the transition animation (e.g., a configured amount, 2 seconds, 3 seconds, etc.) and the frame rate of the video encoder and/or user device 110. Thus, when transitioning from a smaller view area to a larger view area, the intermediate view areas, and user device GUI rendered into the intermediate view areas, will get larger with each video frame generated from the external display buffer. Likewise, when transitioning from a larger view area to a smaller view area, the intermediate view areas, and user device GUI rendered into the intermediate view areas, will get smaller with each video frame generated from the external display buffer. With each encoded frame, user device 110 can generate metadata that describes the size and location of each intermediate view area so that accessory device 140 can determine which portion of the frame to decode and/or extract to obtain the user device GUI corresponding to the intermediate view areas and generate the composite GUI at accessory device 140.

At step 710, user device 110 can send the generated video frames, including intermediate view area definitions, to accessory device 140 for presentation on a display of the accessory device. For example, user device 110 can send the generated frames and user device GUI metadata (e.g., frame metadata) that specifies or defines the location and/or size of the intermediate view area captured in the corresponding video frame. Accessory device 140 can use the metadata for each frame to determine how to extract the user device GUI from each frame and generate a composite GUI for each frame by adjusting the accessory device GUI portion of the composite GUI. For example, as the user device GUI portion of the composite GUI gets larger, the accessory device GUI portion of the composite GUI may get proportionately smaller. As the user device GUI portion of the composite GUI gets smaller, the accessory device GUI portion of the composite GUI may get proportionately larger. As accessory device 140 generates and presents the composite GUI for each frame, the composite GUI will present an animation of the transition between the first view area and the second view area. Thus, user device 110 and accessory device 140 can coordinate the composite GUI animation between different user device GUI view areas.

Figure 8:
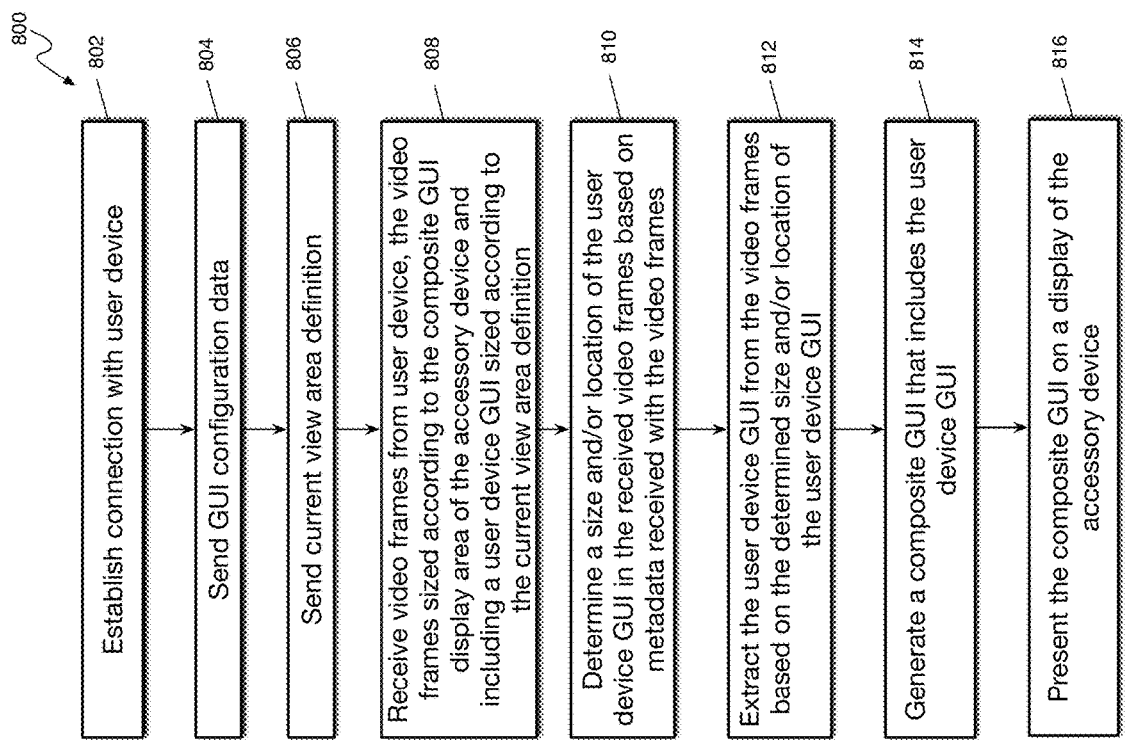
FIG. 8 is flow diagram of an example process for coordinating adjustments to composite graphical user interfaces at an accessory device.

FIG. 8 is flow diagram of an example process 800 for coordinating adjustments to composite graphical user interfaces at an accessory device. For example, process 800 can be performed by accessory device 140 to generate a composite GUI and coordinate changes to the user device GUI portion of the composite GUI with changes to the accessory device portion of the composite GUI and vice versa.

At step 802, accessory device 140 can establish a connection with user device 110. For example, accessory device 140 can advertise its availability to receive graphical user interfaces from user devices and/or to generate composite GUIs. User device 110 can receive the advertisement and initiate contact with accessory device 140 through a network connection (e.g., Bluetooth connection, peer-to-peer Wi-Fi, etc.). User device 110 and accessory device 140 can communicate to establish a GUI streaming connection between devices.

At step 804, accessory device 140 can send GUI configuration data to user device 110. For example, the GUI configuration data can specify or define the dimensions (e.g., size, height/width, geometry, shape, etc.) of the maximum GUI display space allocated to the composite GUI. The GUI configuration data can specify or define the locations and/or dimensions (e.g., size, height/width, geometry, shape, etc.) of various view areas for user device GUIs. The GUI configuration data can specify or define the locations and/or dimensions (e.g., size, height/width, geometry, shape, etc.) of safe areas within each of the defined view areas. The GUI configuration data can specify or define allowable transitions between the various defined view areas. The GUI configuration data can include other configuration data that may be described in other parts of this disclosure.

At step 806, accessory device 140 can send a current view area definition to user device 110. Accessory device 140 can define or identify the current view area by sending a view area identifier that user device 110 can map to a view area definition included in the GUI configuration data sent at step 804. Accessory device 140 can define or identify the current view area by sending location and/or dimension data (e.g., size, height/width, geometry, shape, etc.) for the current view area.

At step 808, accessory device 140 can receive video frames from user device 110. For example, accessory device 140 can configure a video decoder to process video frames having a frame size corresponding to the maximum GUI display space allocated to the composite GUI specified in the GUI configuration data. Similarly, user device 110 can configure a video encoder to generate video frames having a frame size corresponding to the maximum GUI display space allocated to the composite GUI specified in the GUI configuration data. Thus, the video frames received by accessory device 140 and decoded by the video decoder can be sized according to the composite GUI display area of the accessory device. Moreover, the received video frames can include a user device GUI that is sized and located within the video frames as defined by the current view area definition sent to user device 110 at step 806.

At step 808, accessory device 140 can determine a size and/or location of the user device GUI in the received video frames based on metadata received with the video frames. For example, even though accessory device specified the current view area at step 806, user device 110 can include video frame metadata (e.g., user device GUI metadata) in the video stream received by accessory device 140 that specifies the location and/or dimensions of the user device GUI within the video frames. By including the metadata that specifies the location and/or dimensions of the user device GUI within the video frame, accessory device 140 can extract the user device GUI from correct portions of the video frames during view area transitions. The metadata may also allow accessory device 140 to confirm that user device 110 has generated the user device GUI in the view area specified at step 806.

At step 810, accessory device 140 can extract the user device GUI from the video frames based on the determined size and/or location of the user device GUI. For example, accessory device 140 can crop the frame image to the location and dimensions of the user device GUI specified in the received video frame metadata (e.g., user device GUI metadata).

At step 814, accessory device 140 can generate a composite GUI that includes the user device GUI. For example, for each video frame received from user device 110, accessory device 140 can extract the user device GUI from the frame and generate a composite GUI by combining the user device GUI and an accessory device GUI within the maximum GUI display area such that the combination of the user device GUI and the accessory device GUI covers the entire maximum GUI display area.

At step 816, accessory device 140 can present the composite GUI on a display of the accessory device. For example, for each video frame received from user device 110, accessory device 140 can generate a composite GUI and present the composite GUI on a display of accessory device 140. If the user device GUI changes and/or the accessory device GUI changes with each frame, the composite GUI presented on the display of accessory device 140 will change. Thus, the above processes allow or provide for user device 110 and accessory device 140 to coordinate animations and/or other changes to the composite GUI generated by both devices.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping. In addition to, or instead of, a touch-sensitive surface (e.g., touch screen display), one or more of these electronic devices may support, or include, touch pads, knobs, buttons, or other physical controls for providing input to the electronic devices.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to coordinate the behavior of composite graphical user interfaces generated by multiple devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the user experience when interacting with multiple devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of coordinating user interfaces between multiple devices, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, coordination of graphical user interfaces can be performed based on non-personal information data or a bare minimum amount of personal information, such as the content being requested by the device associated with a user, other non-personal information available to the graphical user interface coordinating processes, or publicly available information.

Example System Architecture

Figure 9:
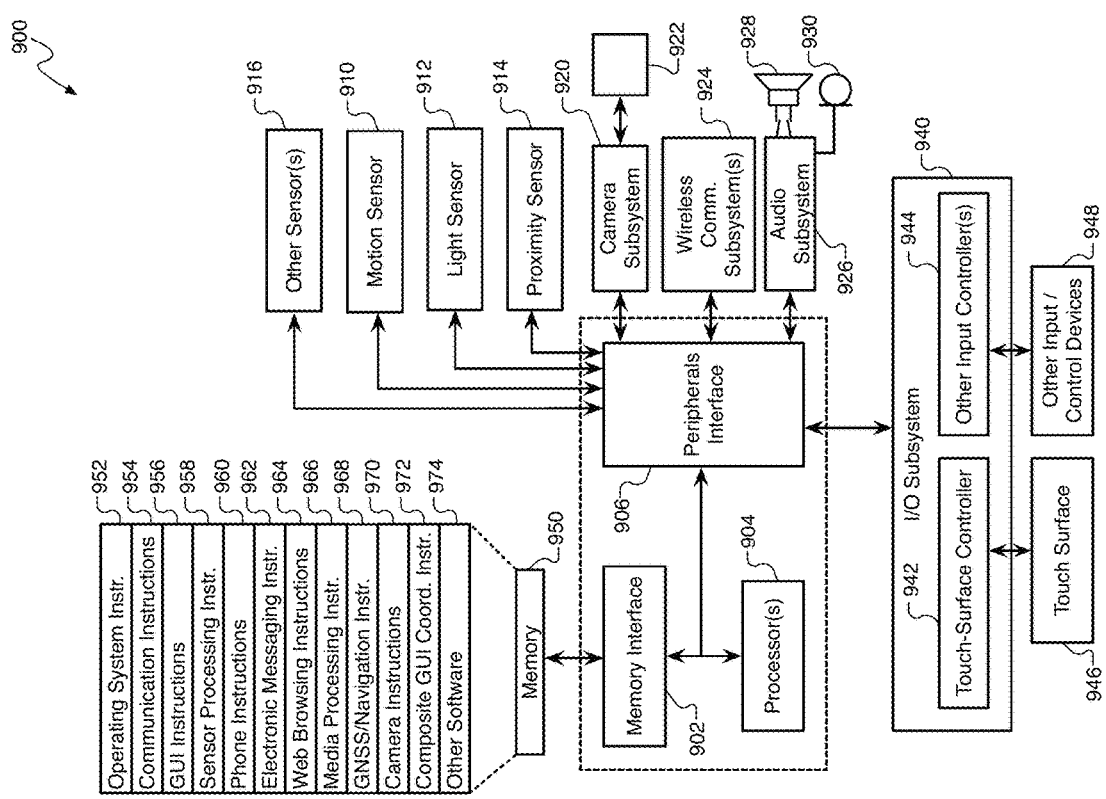
FIG. 9 is a block diagram of an example computing device that can implement the features and processes of FIGS. 1-8.

FIG. 9 is a block diagram of an example computing device 900 that can implement the features and processes of FIGS. 1-8. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a LTE network, an 5G network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™.

The memory interface 902 can be coupled to memory 950. The memory 950 can include high-speed random-access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement the composite GUI coordination features as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store software instructions 972 to facilitate other processes and functions, such as the composite GUI coordination processes and functions as described with reference to FIGS. 1-8.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
receiving, by a user device, a current view area definition from an accessory device, the current view area definition defining a first portion of a maximum GUI display area where the user device will generate a user device GUI;
generating, by the user device, video frames having dimensions corresponding to the maximum GUI display area and including a user device GUI in a second portion of the video frames corresponding to the first portion of the maximum GUI display area;
generating, by the user device, video frame metadata describing a size and location of the user device GUI within the video frames; and
sending, by the user device, the video frames and the video frame metadata to the accessory device, where the accessory device obtains the user device GUI from the video frames based on the metadata and presents the user device GUI on a display of the accessory device.

2. The method of claim 1, further comprising:
receiving, by the user device, composite graphical user interface (GUI) configuration data from the accessory device, the composite GUI configuration data defining a maximum GUI display area and a plurality of view area definitions.

3. The method of claim 1, further comprising:
generating, by the user device, an external display buffer having a size corresponding to the maximum GUI display area;
generating, by the user device, a user device GUI in a third portion of the external display buffer corresponding to the first portion of the maximum GUI display area; and
generating, by the user device, the video frames based on the external display buffer.

4. The method of claim 1, further comprising:
receiving, by the user device, an update view area definition from the accessory device that identifies a fourth portion of the maximum GUI display area for generating the user device GUI; and
generating, by the user device, video frames having dimensions corresponding to the maximum GUI display area and including a user device GUI in a fifth portion of the video frames corresponding to the fourth portion of the maximum GUI display area.

5. The method of claim 4, further comprising:
generating, by the user device, a transition animation for transitioning from the current view area to the updated view area by generating the user device GUI within intermediate view areas between the current view area and the updated view area within the video frames;
generating, by the user device, video frame metadata that describes a size and location of the intermediate view areas within the video frames; and
sending the video frames and the video frame metadata to the accessory device, where the accessory device uses the intermediate view areas and the metadata to generate a composite GUI that presents the transition animation.

6. The method of claim 4, further comprising:
receiving, by the user device from the accessory device, user input related to the user device GUI presented by the accessory device;
determining, by the user device, a second view area based on the user input;
sending, by the user device, a request to transition to the second view area; and
receiving, by the user device, the updated view area definition that corresponds to the second view area.

7. The method of claim 1, further comprising:
determining, by the user device, a safe area within the current view area based on the view area definition; and
determining, by the user device, at least one important feature of the user device GUI; and
generating, by the user device, the at least one important feature within the safe area of the current view area.

8. A non-transitory computer readable medium including one or more sequences of instructions that, when executed by one or more processors, cause the processors to perform operations comprising:
receiving, by a user device, a current view area definition from an accessory device, the current view area definition defining a first portion of a maximum GUI display area where the user device will generate a user device GUI;
generating, by the user device, video frames having dimensions corresponding to the maximum GUI display area and including a user device GUI in a second portion of the video frames corresponding to the first portion of the maximum GUI display area;
generating, by the user device, video frame metadata describing a size and location of the user device GUI within the video frames; and
sending, by the user device, the video frames and the video frame metadata to the accessory device, where the accessory device obtains the user device GUI from the video frames based on the metadata and presents the user device GUI on a display of the accessory device.

9. The non-transitory computer readable medium of claim 8, wherein the instructions cause the processors to perform operations comprising:
receiving, by the user device, composite graphical user interface (GUI) configuration data from the accessory device, the composite GUI configuration data defining a maximum GUI display area and a plurality of view area definitions.

10. The non-transitory computer readable medium of claim 8, wherein the instructions cause the processors to perform operations comprising:
generating, by the user device, an external display buffer having a size corresponding to the maximum GUI display area;
generating, by the user device, a user device GUI in a third portion of the external display buffer corresponding to the first portion of the maximum GUI display area; and
generating, by the user device, the video frames based on the external display buffer.

11. The non-transitory computer readable medium of claim 8, wherein the instructions cause the processors to perform operations comprising:
receiving, by the user device, an update view area definition from the accessory device that identifies a fourth portion of the maximum GUI display area for generating the user device GUI; and
generating, by the user device, video frames having dimensions corresponding to the maximum GUI display area and including a user device GUI in a fifth portion of the video frames corresponding to the fourth portion of the maximum GUI display area.

12. The non-transitory computer readable medium of claim 11, wherein the instructions cause the processors to perform operations comprising:
generating, by the user device, a transition animation for transitioning from the current view area to the updated view area by generating the user device GUI within intermediate view areas between the current view area and the updated view area within the video frames;
generating, by the user device, video frame metadata that describes a size and location of the intermediate view areas within the video frames; and
sending the video frames and the video frame metadata to the accessory device, where the accessory device uses the intermediate view areas and the metadata to generate a composite GUI that presents the transition animation.

13. The non-transitory computer readable medium of claim 11, wherein the instructions cause the processors to perform operations comprising:
receiving, by the user device from the accessory device, user input related to the user device GUI presented by the accessory device;
determining, by the user device, a second view area based on the user input;
sending, by the user device, a request to transition to the second view area; and
receiving, by the user device, the updated view area definition that corresponds to the second view area.

14. The non-transitory computer readable medium of claim 8, wherein the instructions cause the processors to perform operations comprising:
determining, by the user device, a safe area within the current view area based on the view area definition; and
determining, by the user device, at least one important feature of the user device GUI; and
generating, by the user device, the at least one important feature within the safe area of the current view area.

15. A system comprising:
one or more processors, and
a non-transitory computer readable medium including one or more sequences of instructions that, when executed by the one or more processors, cause the processors to perform operations comprising:
receiving, by a user device, a current view area definition from an accessory device, the current view area definition defining a first portion of a maximum GUI display area where the user device will generate a user device GUI;
generating, by the user device, video frames having dimensions corresponding to the maximum GUI display area and including a user device GUI in a second portion of the video frames corresponding to the first portion of the maximum GUI display area;
generating, by the user device, video frame metadata describing a size and location of the user device GUI within the video frames; and
sending, by the user device, the video frames and the video frame metadata to the accessory device, where the accessory device obtains the user device GUI from the video frames based on the metadata and presents the user device GUI on a display of the accessory device.

16. The system of claim 15, wherein the instructions cause the processors to perform operations comprising:
receiving, by the user device, composite graphical user interface (GUI) configuration data from the accessory device, the composite GUI configuration data defining a maximum GUI display area and a plurality of view area definitions.

17. The system of claim 15, wherein the instructions cause the processors to perform operations comprising:
generating, by the user device, an external display buffer having a size corresponding to the maximum GUI display area;
generating, by the user device, a user device GUI in a third portion of the external display buffer corresponding to the first portion of the maximum GUI display area; and
generating, by the user device, the video frames based on the external display buffer.

18. The system of claim 15, wherein the instructions cause the processors to perform operations comprising:
receiving, by the user device, an update view area definition from the accessory device that identifies a fourth portion of the maximum GUI display area for generating the user device GUI; and
generating, by the user device, video frames having dimensions corresponding to the maximum GUI display area and including a user device GUI in a fifth portion of the video frames corresponding to the fourth portion of the maximum GUI display area.

19. The system of claim 18, wherein the instructions cause the processors to perform operations comprising:
generating, by the user device, a transition animation for transitioning from the current view area to the updated view area by generating the user device GUI within intermediate view areas between the current view area and the updated view area within the video frames;
generating, by the user device, video frame metadata that describes a size and location of the intermediate view areas within the video frames; and
sending the video frames and the video frame metadata to the accessory device, where the accessory device uses the intermediate view areas and the metadata to generate a composite GUI that presents the transition animation.

20. The system of claim 18, wherein the instructions cause the processors to perform operations comprising:
receiving, by the user device from the accessory device, user input related to the user device GUI presented by the accessory device;
determining, by the user device, a second view area based on the user input;
sending, by the user device, a request to transition to the second view area; and
receiving, by the user device, the updated view area definition that corresponds to the second view area.

21. The system of claim 15, wherein the instructions cause the processors to perform operations comprising:
determining, by the user device, a safe area within the current view area based on the view area definition; and
determining, by the user device, at least one important feature of the user device GUI; and
generating, by the user device, the at least one important feature within the safe area of the current view area.

* * * * *